(12) United States Patent
Baek et al.

(10) Patent No.: US 10,073,910 B2
(45) Date of Patent: Sep. 11, 2018

(54) SYSTEM AND METHOD FOR BROWSING SUMMARY IMAGE

(71) Applicant: HANWHA TECHWIN CO.,LTD., Changwon-Si (KR)

(72) Inventors: Youngmin Baek, Changwon-si (KR); Daehwan Kim, Changwon-si (KR); Seoungseon Jeon, Changwon-si (KR); Jisung Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/790,199

(22) Filed: Jul. 2, 2015

(65) Prior Publication Data
US 2016/0232234 A1    Aug. 11, 2016

(30) Foreign Application Priority Data
Feb. 10, 2015  (KR) .......................... 10-2015-0020291

(51) Int. Cl.
| | |
|---|---|
| G11B 27/00 | (2006.01) |
| H04N 5/93 | (2006.01) |
| H04N 9/80 | (2006.01) |
| G06F 17/30 | (2006.01) |
| G11B 27/031 | (2006.01) |
| G11B 27/28 | (2006.01) |

(52) U.S. Cl.
CPC ...... *G06F 17/30793* (2013.01); *G11B 27/031* (2013.01); *G11B 27/28* (2013.01)

(58) Field of Classification Search
USPC .................................................. 386/239–248
See application file for complete search history.

(56) References Cited

U.S. PATENT DOCUMENTS

| | | | |
|---|---|---|---|
| 2005/0180730 A1 | 8/2005 | Huh et al. | |
| 2007/0162873 A1* | 7/2007 | Haro | G06F 17/3079 715/838 |
| 2007/0211962 A1* | 9/2007 | Bang | H04N 1/3876 382/284 |
| 2008/0317314 A1* | 12/2008 | Schwartz | G06K 9/34 382/131 |
| 2011/0242130 A1* | 10/2011 | Toba | G06T 11/00 345/629 |
| 2013/0027551 A1 | 1/2013 | Peleg et al. | |

(Continued)

FOREIGN PATENT DOCUMENTS

| | | |
|---|---|---|
| JP | 2004-320659 A | 11/2004 |
| KR | 2001-0037151 A | 5/2001 |

(Continued)

*Primary Examiner* — Hung Dang
(74) *Attorney, Agent, or Firm* — Sughrue Mion, PLLC

(57) ABSTRACT

Provided are a system and a method for browsing a summary image. The method includes: tracking at least one object included in an input video image including a plurality of image frames, by controlling an image processing engine; selecting a representative image frame of each of the at least one object from the image frames, by controlling the image processing engine; and generating at least one summary still image comprising at least one object segment extracted from the representative image frame of each of the at least one object, by controlling a browsing engine.

12 Claims, 7 Drawing Sheets

(56) References Cited

U.S. PATENT DOCUMENTS

| | | | |
|---|---|---|---|
| 2015/0104149 A1* | 4/2015 | Sim | G11B 27/031 386/241 |
| 2016/0239712 A1* | 8/2016 | Kitano | G06T 7/246 |
| 2016/0259970 A1* | 9/2016 | Wee | G06K 9/00885 |

FOREIGN PATENT DOCUMENTS

| | | | | |
|---|---|---|---|---|
| KR | 10-2004-0016906 A | 2/2004 | | |
| KR | 10-2005-0082378 A | 8/2005 | | |
| KR | 10-2013-0061058 A | 6/2013 | | |
| WO | WO 2014/189250 A3 * | 11/2014 | | G06K 9/00885 |
| WO | WO 2015/045233 A1 * | 4/2015 | | G06K 9/00744 |

* cited by examiner

SYSTEM AND METHOD FOR BROWSING SUMMARY IMAGE

CROSS-REFERENCE TO THE RELATED APPLICATION

This application claims priority from Korean Patent Application No. 10-2015-0020291, filed on Feb. 10, 2015, in the Korean Intellectual Property Office, the disclosure of which is incorporated herein in its entirety by reference.

BACKGROUND

1. Field

Apparatuses and methods consistent with exemplary embodiments relate to systems and methods for browsing a summary image.

2. Description of the Related Art

As the demand for multimedia services such as image and video services increases and portable multimedia devices are generally popularized, there is an increasing need for an efficient multimedia searching and browsing system that may manage a huge amount of multimedia data and by quickly and accurately finding and providing contents desired by consumers.

SUMMARY

Exemplary embodiments of the inventive concept provide image browsing systems and methods that allow a user to conveniently review search results.

Various aspects of the inventive concept will be set forth in part in the description which follows and, in part, will be apparent from the description, or may be learned by practice of the presented exemplary embodiments.

According to one or more exemplary embodiments, there is provided a method for browsing a summary image. The method may include: tracking at least one object included in an input video image including a plurality of image frames, by controlling an image processing engine; selecting a representative image frame of each of the at least one object from the image frames, by controlling the image processing engine; and generating at least one summary still image comprising at least one object segment extracted from the representative image frame of each of the at least one object, by controlling a browsing engine.

The selecting the representative image frame may include selecting an image frame having a highest score for at least one object selection condition as the representative image frame, from among the plurality of image frames.

The at least one object selection condition may include at least one of an attribute of the at least one object, a blur effect in the plurality of image frames, a degree of overlapping between the at least one object and another object. Each of the at least one object selection condition may be given a predetermined score range.

The at least one summary still image may further include a background image which is generated base on a still region in the plurality of image frames.

A size and a position of the at least one object segment in the at least one summary still image correspond to a size and a position of the at least one object shown in the representative image frame.

The generating the at least one summary still image comprises generating the at least one summary still image according to an order of appearance time of the at least one object in the plurality of image frames and a maximum number of objects set in one summary still image.

The method may further include providing a preview image of a motion of an object segment selected from among the at least one object segment in response to a selection signal of selecting the object segment in the at least one summary still image.

The method may further include reproducing the motion of the selected object segment in an order of time in response to a selection signal of selecting the preview image on the at least one summary still image.

The method may further include: receiving a search condition signal to instruct generation of the at least one summary still image; and generating metadata of the representative image frame. The metadata may include time information about the representative image frame and position information about the at least one object in the representative image frame.

The selecting of the representative image frame may be performed after the receiving the search condition signal.

According to one or more exemplary embodiments, there is provided a system for browsing a summary image which may include: an image processing engine configured to track at least one object included in an input video image which includes a plurality of image frames and select a representative image frame of each of the at least one object from the image frames; and a browsing engine configured to generate at least one summary still image comprising at least one object segment extracted from the representative image frame of each of the at least one object. The image processing engine may select an image frame having a highest score for at least one object selection condition as the representative image frame, from among the plurality of image frames.

The size and a position of the at least one object segment in the at least one summary still image may correspond to a size and a position of the at least one object shown in the representative image frame.

The browsing engine may generate the at least one summary still image according to an order of appearance time of the at least one object in the plurality of image frames and a maximum number of objects set in one summary still image. The browsing engine may provide a preview image of a motion of an object segment selected from among the at least one object segment in response to a selection signal of selecting the object segment in the at least one summary still image.

The browsing engine may reproduce the motion of the selected object segment in an order of time in response to a selection signal of selecting the preview image on the at least one summary still image.

The system may further include a query engine configured to receive a search condition signal to instruct generation of the at least one summary still image.

The image processing engine may be further configured to generate metadata of the representative image frame, and select the representative image frame after the query engine receives the search condition signal.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Figure 1:
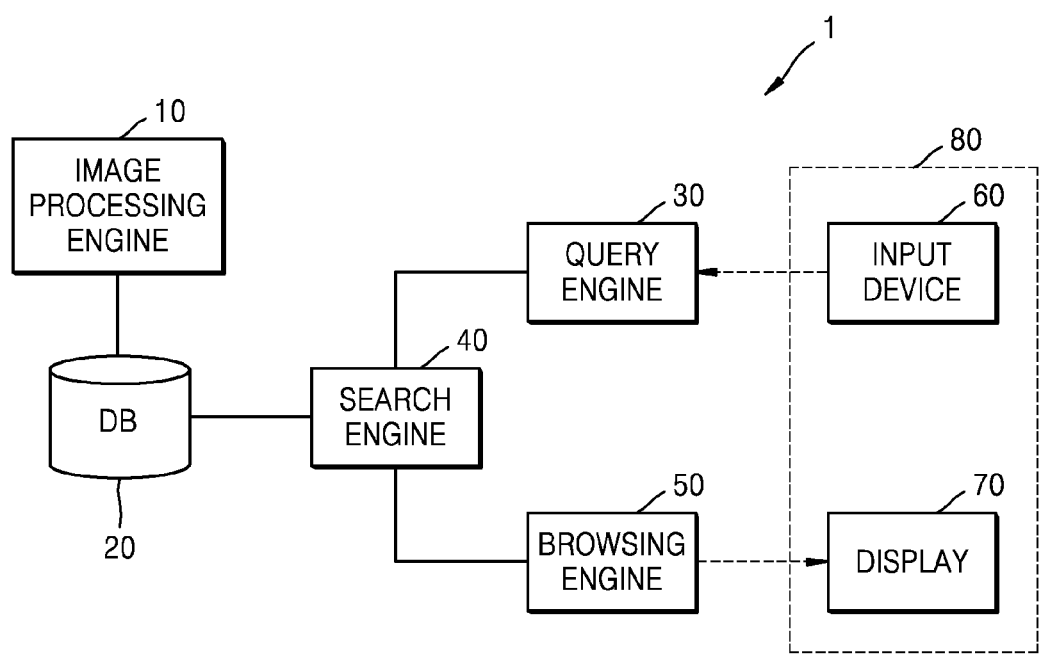
FIG. 1 is a schematic block diagram of an image browsing system according to an exemplary embodiment.

Reference will now be made in detail to exemplary embodiments, which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed items.

The inventive concept may include various exemplary embodiments and modifications, and these exemplary embodiments are illustrated in the drawings and will be described below in detail. However, it will be understood that the inventive concept is not limited to the exemplary embodiments and includes all modifications, equivalents, and substitutions falling within the spirit and scope of the inventive concept. In the following description, detailed descriptions of well-known functions or configurations will be omitted since they would unnecessarily obscure the subject matters of the inventive concept.

In the following exemplary embodiments, although terms such as "first" and "second" may be used herein to describe various elements or components, these elements or components should not be limited by these terms. These terms are only used to distinguish one element or component from another element or component.

The terms used herein are for the purpose of describing exemplary embodiments only and are not intended to limit the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The exemplary embodiments may be described in terms of functional block components and various processing operations in reference to the drawings. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices. Similarly, where the elements of the exemplary embodiments are implemented by software programming or software elements, the exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the exemplary embodiments may employ the related art for electronic environment setting, signal processing, and/or data processing. Terms such as "mechanism," "element," "unit," "module" and "configuration" may be used in a broad sense, and are not limited to mechanical and physical configurations. The terms may include the meaning of software routines in conjunction with processors or the like.

Figure 2:
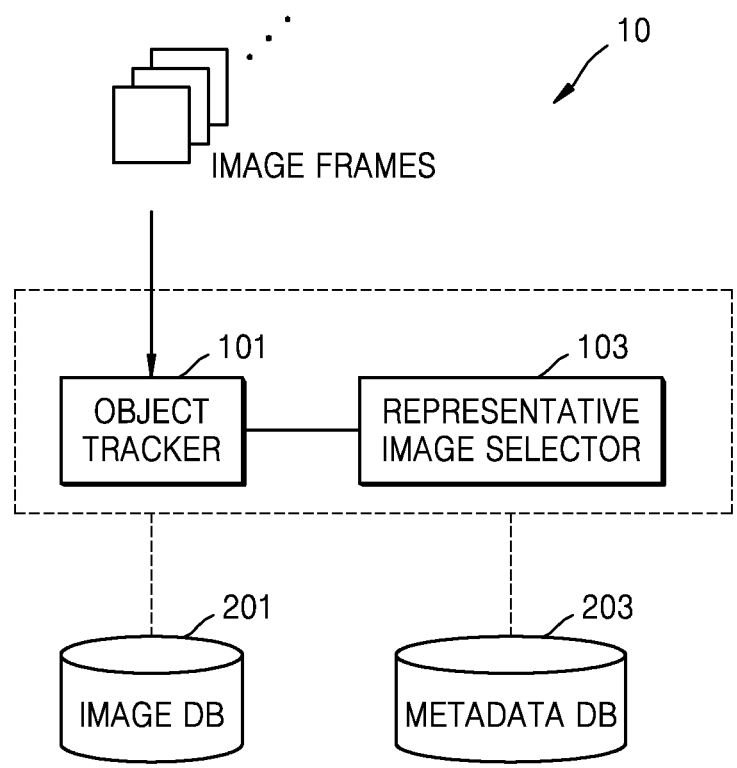
FIG. 2 is a schematic block diagram of an image processing engine of FIG. 1, according to an exemplary embodiment.

FIG. 1 is a schematic block diagram of an image browsing system according to an exemplary embodiment. FIG. 2 is a schematic block diagram of an image processing engine of FIG. 1.

Referring to FIG. 1, an image browsing system 1 may perform a series of processes for providing search results to a user and allowing the user to understand the search results. The image browsing system 1 may include an image processing engine 10, a database (DB) 20, a query engine 30, a search engine 40, and a browsing engine 50.

The image processing engine 10 may perform image analyses such as image disappearance detection, object motion detection, and object appearance/disappearance detection in an input video image. Also, the image processing engine 10 may perform background detection, foreground and object detection, object counting, camera tampering detection, face detection, and the like. Also, the image processing engine 10 may calculate image brightness, color, texture, and contour (shape) information.

The input video image may a video image that is directly transmitted from a camera (not illustrated) that is an image sensor connected to the image browsing system 1, a video image that is stored in a network video recorder (NVR) or a digital video recorder (DVR) connected to the image browsing system 1, or a video image that is input on various channels through a network (not illustrated).

The image processing engine 10 may include an object tracker 101 and a representative image selector 103.

The object tracker 101 may determine a motion region as an object of interest from a plurality of image frames constituting the input video image and track a motion trajectory of the object. The object tracker 101 may acquire tracking information about the object in the video image by collecting information about an object change between the consecutive image frames.

The representative image selector 103 may select a representative image frame among image frames which follows or represents the tracked motion trajectory of the object based on a predetermined selection condition. The selection condition may be set variously by the user. The selection condition may include an external shape of the object and a positional relationship of the object with another object (e.g., the degree of overlap between objects). For example, the representative image selector 103 may determine whether the object is a person or a vehicle. In this case, when the object is a person, the representative image selector 103 may first select an image frame including a face as an example; and when the object is a vehicle, the representative image selector 103 may first select an image frame including a license plate as an example. The representative image selector 103 may first select an image frame having a large object size. The representative image selector 103 may first select an image frame having a minimum blur effect. The representative image selector 103 may first select an image frame having no or minimum occlusion with another object. The representative image selector 103 may first select an image frame in which an event designated by the user is detected. The event may include a specific motion, a specific voice, and the like. Since the object selection condition is determined considering whether it can increase chances of identifying the object, the selection of the representative image frame may allow the user to easily identify the object. One or more selection conditions may be set. The representative image selector 103 may set a score for each of one or more selection conditions and select an image frame having the highest final score as the representative image frame of each object. The scores for selection conditions may be set identically or differently according to a priority order considered by the user. For example, an object size, a blur effect, and an overlap degree may be set as selection conditions, and a score may be set for each of the selection conditions. Here, the score for each selection condition may be set over a predetermined score range which may differ by selection condition. According to a degree of satisfying a certain selection condition in an image frame, the score for this selection condition is set to the image frame. The scores for selection conditions on each image frame of each object may be summed up, and an image frame having the highest sum score may be selected as the representative image frame.

The representative image selector 103 may extract an object and generate an object segment from the representative image frame selected for each object. The object segment may be a block of a predetermined size that surrounds, encloses or encompasses an object, or the object itself extracted from the representative image frame. The representative image selector 103 may generate metadata which includes time information (time stamp) about the representative image frame, position information about the object in the representative image frame, etc.

When a video image is input, the representative image selector 103 may select the representative image frame of each object based on the selection condition considering the object tracking result, and generate and store metadata thereof. Alternatively, when a video image is input and a summary still image is requested by the user or the image browsing system 1, the representative image selector 103 may select the representative image frame of each object based on the selection condition and a positional relationship between objects in the input video image, and generate and store related metadata.

The DB 20 stores input video images, video image analysis results, and the like. The video image analysis results may be stored in a form of text-based metadata or image-based metadata. The image processing engine 10 may structure and organize the metadata for easy search and store the results in the DB 20.

The DB 20 may include an image DB 201 and a metadata DB 203. The input video images and a video image for each object (i.e., a series of image frames following or representing the motion trajectory of the object) may be stored in the image DB 201. The metadata of time information about the representative image frame of each object and the position information about the object in the representative image frame may be stored in the metadata DB 203. Also, the time information (time stamp) about the video image for each object may be stored in the metadata DB 203. Also, the object segment extracted from the representative image frame may be stored in the metadata DB 203 in a form of image-based metadata.

Also, the image processing engine 10 may determine a still region as a background in a plurality of image frames and generate a background image. A background image generating method is not limited to a particular method and the background image may be generated by various known methods.

Also, the image processing engine 10 may perform an image analysis and generate an event when the image analysis result satisfies a predetermined event generation condition. Herein, the event may include a system event set in the system, such as generation of a network error or setting of a new camera. Also, the event may include a user event set by the user, such as appearance of an object, generation of an image specified by the user (e.g., the appearance of an unrecognizable face image), a change of a screen color, an occurrence of a motion in a predetermined region, generation of an unusual sound source (e.g., a car tire friction (skid) sound, a glass breaking sound, an alarm sound, an impact sound, or the like), generation of a sound source specified by the user (e.g., a shout, a scream, a cry, or the like), or generation of a voice higher than a critical level.

The query engine 30 receives an input of one or more search conditions through an input device 60, analyzes requirements of the user from the search conditions, and reconstructs the same in a predetermined form. For example, the user may input search conditions, such as a time period, an object category, a color, a region of interest (ROI) in a monitoring region, a certain direction and a certain line in the monitoring region, through the input device 60. For example, the time period may be set as date/time. The object category may be set as an object type (e.g., person, vehicle, or animal), a particular object (e.g., John Doe, white vehicle, or cat), or the like.

The search engine 40 may receive the reconstructed search conditions and access the DB 20 according to the search conditions to find necessary information. The search engine 40 may extract one or more image frames and metadata corresponding to the search conditions.

The browsing engine 50 may receive a background image and an object segment of a representative image frame of each object from the search engine 40 (or the image processing engine 10), and synthesize the object segment into the background image to generate a summary still image. The background image may be a certain still image or a background image generated from an input video image.

The browsing engine 50 may perform visualization for clear discrimination between a background and a foreground (object). As an example of the visualization, an object may be represented by a certain color or by a certain figure (such as a tetragon or a circle). One or more summary still images may be generated according to the number of objects in the video image and an overlap between the objects. Two or more summary still images may maintain an order of time corresponding to appearance time of the object. The summary still image may include a text representing object information. The object information may include information about the object category (e.g., person, vehicle, animal, or the like), appearance and/or maintenance time, and an object segment color.

The browsing engine 50 may render the summary still image on a display 70 in real time. The browsing engine 50 may display one or more summary still images which shows a plurality of objects satisfying the search conditions. The browsing engine 50 may arrange a plurality of summary still images in the order of time on the basis of the appearance time of the object. For example, a temporally-preceding summary still image may be disposed before or after a temporally-following summary still image. When it is determined that one summary still image is completely filled with a plurality of objects, the browsing engine 50 generates a next summary still image. The browsing engine 50 repeats the generation of a summary still image until all objects within a requested time period are summarized as one or more still images.

The browsing engine 50 may render a plurality of object segments of a plurality of objects in one or more same background images by using the appearance time and position information about the objects. Accordingly, a summary still image based on interaction between different objects may be provided.

When an object in a summary still image is selected, the browsing engine 50 may provide a video image of the selected object as a preview image. The preview image may be provided around the selected object in a form of a speech balloon hint. When the preview image is selected (e.g., mouse over and click of the preview image), the browsing engine 50 may reproduce the video image of the object. Accordingly, the user may quickly search for an object of interest and may quickly determine what event has occurred during the selected time period.

A user terminal 80 may be a computer or a mobile terminal that is used by a security participant or the user that manages the image browsing system 1. The user may control the image browsing system 1 through the user terminal 80. The user terminal 80 includes the input device 60 that is a user interface that enables the user to input a query (search condition) into the image browsing system 1.

The input device 60 is connected wirelessly or by wire to the image browsing system 1 to generate input data for allowing the user to control operations of the image browsing system 1. The input device 60 may include a keypad, a dome switch, a touch pad (such as a capacitive overlay type, a resistive overlay type, an infrared beam type, a surface acoustic wave type, an integral strain gauge type, a piezoelectric type or a touchless proximity sensor type), a mouse, a remote controller, a jog wheel, and a jog switch. The user terminal 80 may set display conditions of a result image by correcting, adding, or deleting the search conditions by using the input device 60. The user terminal 80 may adjust arrangement, merging, and reproduction of the displayed result image by using the input device 60.

The display 70 provides the user with the result image output from the browsing engine 50, thus enabling the user to monitor the displayed image. The display 70 may provide visual information and/or aural information to the user. The display 70 may include a liquid crystal display (LCD) panel, an organic light-emitting display (OLED) panel, or an electrophoretic display (EPD) panel. The display 70 may be provided in a form of a touchscreen capable of receiving an input according to a user's touch, to function as an input interface.

In a closed-circuit television (CCTV) image security system, images captured by cameras are transmitted/received through a transmission network so that a person may directly monitor security circumstances by using monitors, or the images are stored in a DVR, a NVR, or a video management system (VMS) so that a person may search for the stored images afterward. However, in the CCTV image security system, the analysis and direct monitoring by the person are limited due to a rapid increase in the number of CCTV cameras, and the time taken to search for the stored images also increases exponentially due to the rapid increase in the number of CCTV cameras. Accordingly, video synopsis/summary technology has been developed. The video summary technology summarizes a long-time recorded image to provide a compressed image, thus assisting the user to efficiently search for the recorded image.

A video image summary scheme collects information about a moving object to provide a new summary image. Thus, for use in a later search, a scene of a plurality of objects simultaneously appearing and moving is produced on a result screen, and the user has to determine whether a desired object exists in the image on the result screen. In this case, when the image summary length is too short, the screen complexity increases and thus a monitoring target object may be missed; and when the image summary length is too long, the search efficiency is lower than that in the case of reproducing a general monitoring image. Also, since a relatively long time is required to summarize the monitoring images into the result image, the search efficiency may be degraded at the time when quick search is required afterward.

According to an exemplary embodiment, a video image of a moving object is summarized and provided as a still image to the user, thus assisting the user to find a monitoring target object without missing it. According to an exemplary embodiment, the still image may be provided by disposing objects so that an overlap between the objects is minimized and a region having no path overlap between the objects is maximized. That is, when n objects exist in an original video image, a main scene (image frame) representing each of the n objects, that is, a representative image frame of each object, is selected to summarize the video image so that all of the n objects may be represented in a single still image. If the objects included in one result summary image overlap too much, a plurality of still images may be provided. An order of the still images may be set to be a time order so that the user may not be confused in searching for an object of interest.

Figure 3:
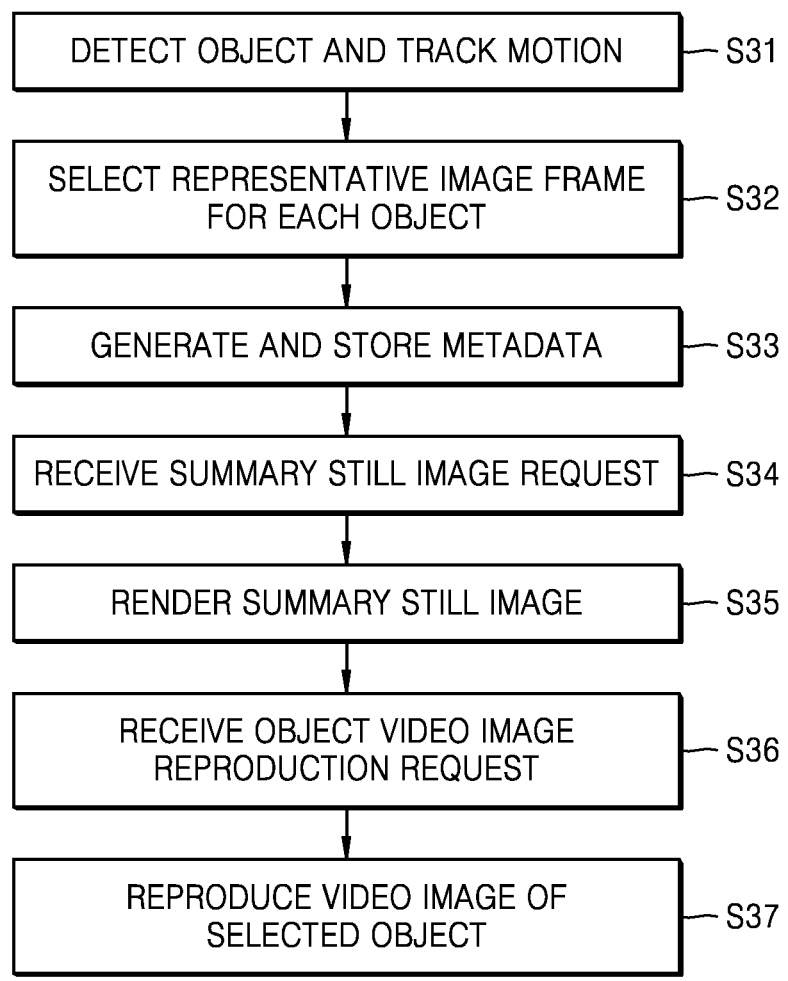
FIG. 3 is a schematic flow diagram of an image browsing method according to an exemplary embodiment.

FIG. 3 is a schematic flow diagram of an image browsing method according to an exemplary embodiment.

The image browsing system may detect an object from a plurality of image frames of an input video image and track a motion of the object (S31). The image browsing system may detect one or more objects from all the image frames by recognition, motion detection, and tracking technologies, and extract and recover a motion trajectory of the objects by continuous tracking.

The image browsing system may select a representative image frame of each object (S32). The image browsing system may set a character image including a face, a vehicle image including a license plate, an image having a large object size, an image having a small blur effect, an image having no or little occlusion with another object, or an image in which an event has occurred, as a selection condition of the representative image frame. The selection condition may be common to some objects, or may be different by object. One or more selection conditions may be set. The image browsing system may set a score for each of one or more selection conditions and select an image frame having the highest final score as the representative image frame of each object. The scores for selection conditions may be set identically or differently according to a priority order considered by the user.

The image browsing system may generate metadata from the representative image frame of each object and store the metadata (S33). The image browsing system may provide a database of the representative image frame of each object and the time information and the position information about the objects in the representative image frame in a form of text-based metadata. The image browsing system may provide a database of the time information about a video image in which each object appears in a form of text-based metadata in order to provide the video image following or representing the entire motion trajectory of each object. The image browsing system may provide a database of the object segment extracted from the representative image frame in a form of image-based metadata. The metadata may be matched and stored for each object.

When receiving a summary still image request from the user terminal (S34), the image browsing system renders and displays a summary still image (S35). The image browsing system receives a search condition from the user terminal and extracts information (metadata and image frames) corresponding to the search condition. The image browsing system may generate at least one summary still image by synthesizing the object segment of each object corresponding to the search condition into a background image. The object segment for each object may be visualized by a certain color or by a certain figure.

When receiving an object video image reproduction request, i.e., when an object is selected from the summary still image (S36), the image browsing system reproduces a video image of the selected object (S37). When sensing a location of an input unit (e.g., a mouse cursor, a digital pen, a finger, or the like) on the object in the summary still image, the image browsing system may provide the video image of the selected object in a form of a preview image. When receiving a selection signal of the preview image (that is, when the preview image is clicked), the image browsing system may reproduce the video image of time period in which the selected object appears. The object video image may provide a scene in which other objects are removed and only the selected object appears.

According to the present exemplary embodiment, when a video image is input, an object is tracked and a representative image frame is selected based on a selection condition for each object to generate and store metadata. In this case, a still summary image may be generated in real time.

Figure 4A:
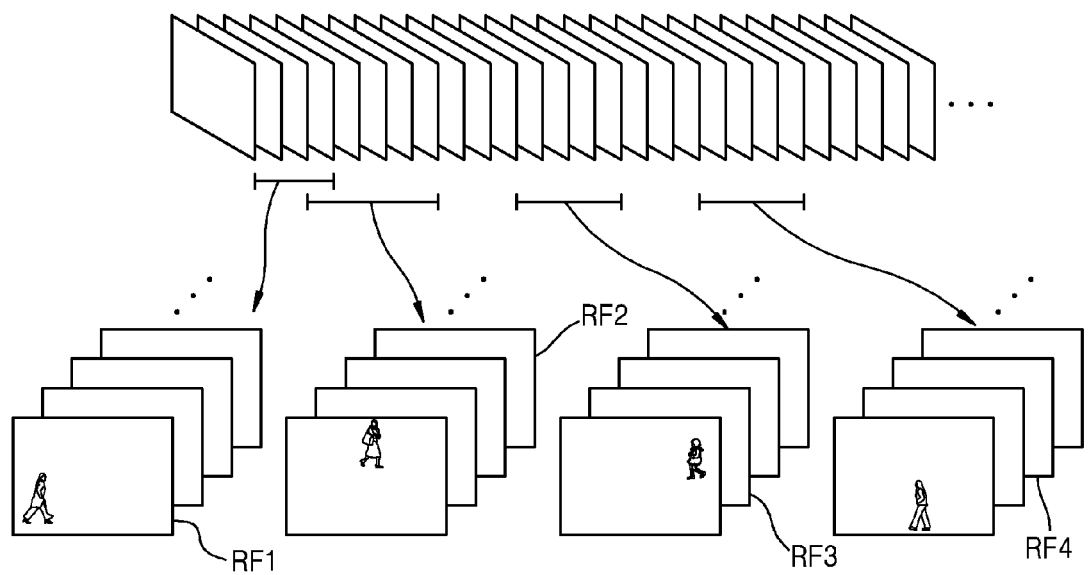
FIGS. 4A through 5C illustrate summary still images generated from an input video image according to exemplary embodiments.
Figure 4B:
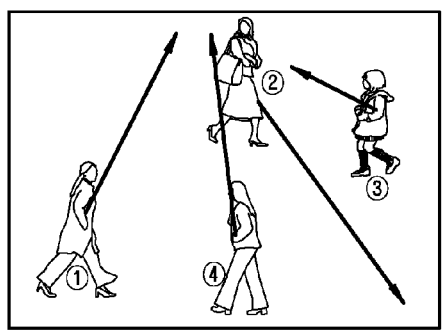
Figure 4C:
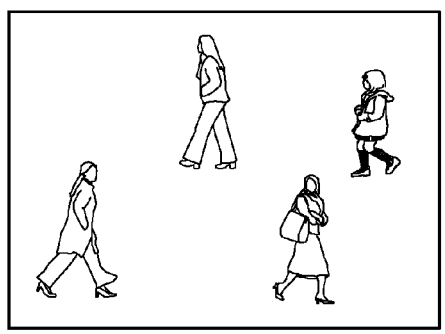
Figure 5A:
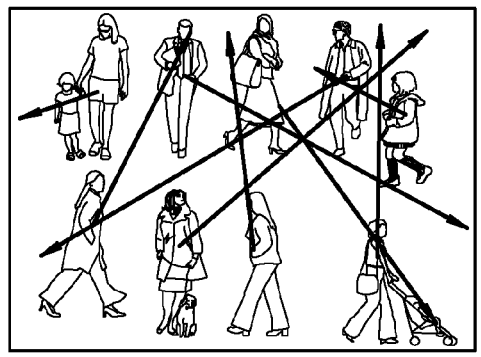
Figure 5B:
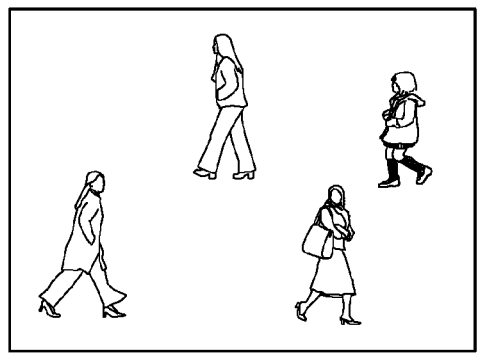
Figure 5C:
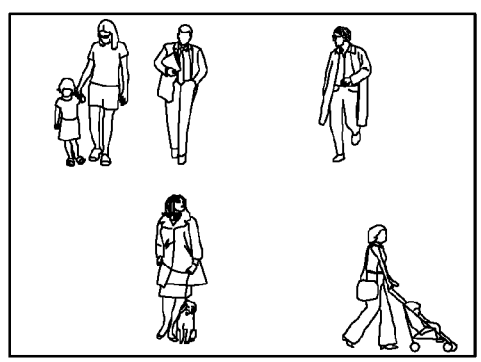

FIGS. 4A through 5C illustrate summary still images generated from an input video image according to exemplary embodiments. FIGS. 4A-4C illustrate an example of generating one summary still image, and FIG. 5A-5C illustrate an example of generating two summary still images.

FIG. 4A illustrates an example of an input video image including a plurality of image frames. In the input vided image, it is assumed that four objects appear simultaneously or at different times and then move along different routes. Time information about an object video image, i.e., image frames of each object, may be stored as metadata as described above. Different objects may appear simultaneously in one image frame. Thus, one image frame may be matched to different objects. In FIG. 4A, for convenience of description, a background and other objects are omitted, and only an object of interest is illustrated.

Among the image frames for each object of FIG. 4A, representative image frames RF1 to RF4 are selected. The representative image frames RF1 to RF4 may be selected for each object based on a selection condition set for each object. An object segment may be extracted from the representative image frames RF1 to RF4 for each object. The representative image frame of each object and metadata such as position information and time information about the object segment may be stored.

FIG. 4B illustrates a motion trajectory (arrow) and an appearance order of four objects in the input video image of FIG. 4A. In the input video image of FIG. 4A, it is assumed that first to fourth objects ① to ④ appear in the order of number at respective positions indicated in FIG. 4B and then move along respective motion trajectories indicated by solid arrow lines.

FIG. 4C illustrates an example in which four objects ① to ④ are represented in one summary still image. All of four object segments extracted from the respective representative image frames RF1 to RF4 are represented in one still image. It may be seen that the representative image frame is selected such that the objects do not overlap with one another. The object segments for the respective objects may be represented by different colors or by different figures.

FIG. 5A illustrates an input video image in which nine objects appear. The nine objects are different in appearance order and in motion trajectory (arrow). When too many objects are represented in one summary still image, an object density value may be changed by designation of the user and the number of summary still images may increase or decrease accordingly.

FIGS. 5B and 5C illustrate an example of representing nine objects in two summary still images in a divided manner. FIG. 5B illustrates a first summary still image in which temporally-preceding four objects are represented. FIG. 5C illustrates a second summary still image in which temporally-following five objects are represented.

Figure 6A:
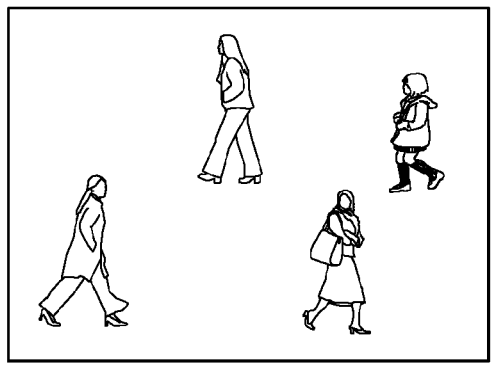
FIGS. 6A-6C illustrate a screen on which a summary still image is displayed according to exemplary embodiments.
Figure 6B:
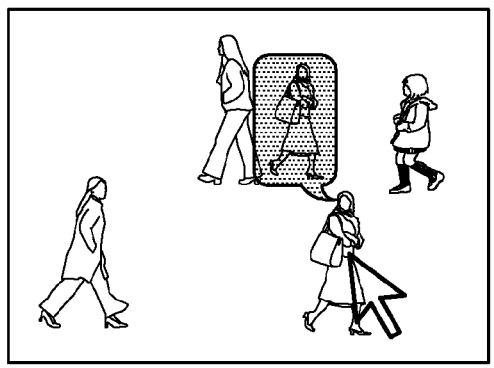
Figure 6C:
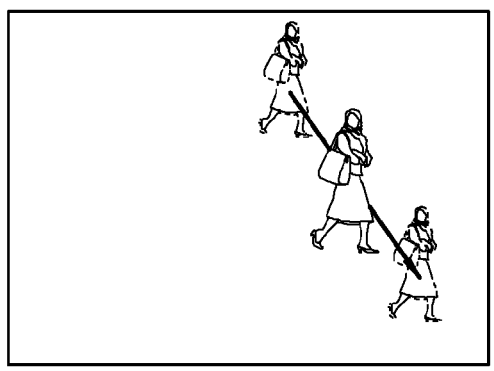

FIGS. 6A-6C illustrate a screen on which a summary still image is displayed according to exemplary embodiments.

In a state of a summary still image being displayed on a screen as illustrated FIG. 6A, when a pointer such as a mouse cursor is located on an object as illustrated in FIG. 6B, a layer may be provided around the selected object in a form of a speech balloon hint and a preview image of the object may be displayed in the layer. When the preview image is clicked, an object video image in which the selected object moves along a motion trajectory may be overlapped and reproduced on an entire screen as illustrated in FIG. 6C. When the reproduction is completed, the summary still image illustrated in FIG. 6A may be again displayed.

Figure 7:
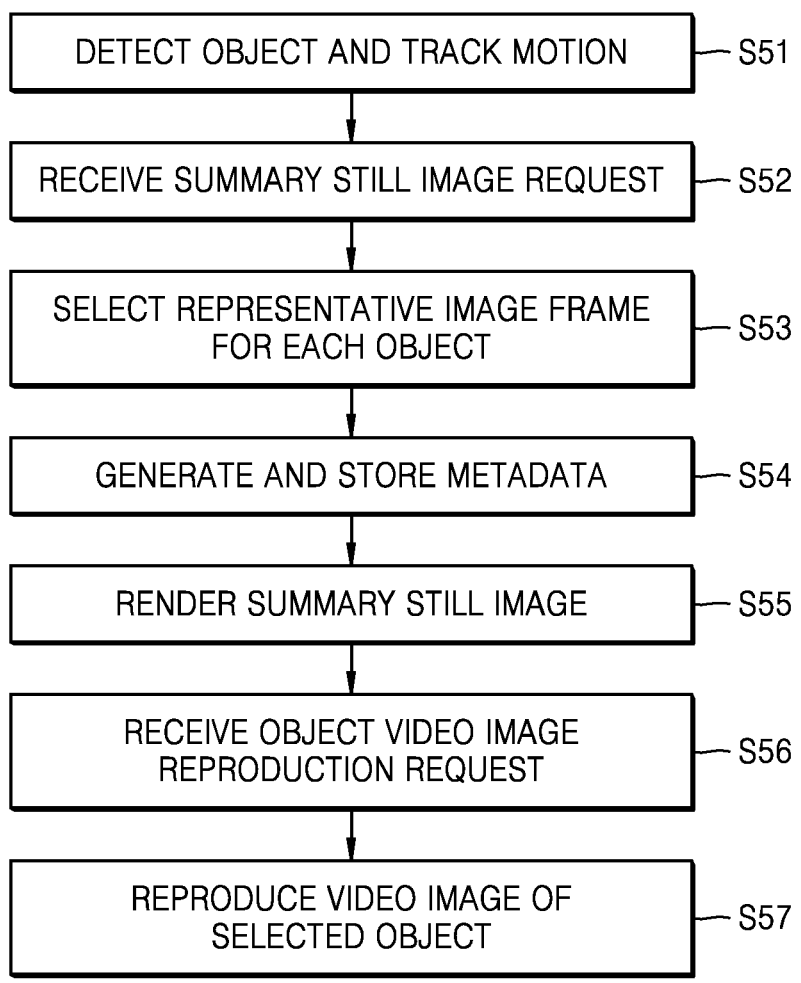
FIG. 7 is a schematic flow diagram of an image browsing method according to another exemplary embodiment.

FIG. 7 is a schematic flow diagram of an image browsing method according to another exemplary embodiment.

The image browsing system may detect an object from a plurality of image frames of an input video image and track a motion of the object (S51). The image browsing system may detect one or more objects from all the image frames by recognition, motion detection, and tracking technologies, and extract and recover a motion trajectories of the objects by continuous tracking.

When receiving a summary still image request from the user terminal (S52), the image browsing system may select a representative image frame of each object (S53). When receiving an input of a search condition from the user terminal, the image browsing system may select a representative image frame of each object in the input video image based on the search condition. As described above, the selection condition of the representative image frame may be set by the user to be common to some objects or to be different by object. One or more selection conditions may be set. The image browsing system may set a score for each of one or more selection conditions and select an image frame having the highest final score as the representative image frame of each object. The scores for selection conditions may be set identically or differently according to a priority order considered by the user.

The image browsing system may generate metadata from the representative image frame of each object and store the metadata (S54). The image browsing system may provide a database of the representative image frame of each object and time information and position information about the object in the representative image frame in a form of text-based metadata. The image browsing system may store time information about each object as metadata in order to provide a video image following an entire motion trajectory of each object. The image browsing system may provide a database of the object segment extracted from the representative image frame in a form of image-based metadata. The metadata may be matched and stored for each object.

The image browsing system renders and displays a summary still image corresponding to the search condition (S55). The image browsing system may generate at least one summary still image by synthesizing the object segment extracted from the representative image frame of each object corresponding to the search condition. The object segment for each object may be visualized by a certain color or by a certain figure.

When receiving an object video image reproduction request, i.e., when an object is selected from the summary still image (S56), the image browsing system reproduces a video image of the selected object (S57). When sensing a location of an input unit (e.g., a mouse cursor, a digital pen, a finger, or the like) on the object in the summary still image, the image browsing system may provide the video image of the selected object in a form of a preview image. When receiving a selection signal of the preview image (that is, when the preview image is clicked), the image browsing system may reproduce the video image showing the entire motion trajectory appearing the selected object. The object video image may provide a scene in which other objects are removed and only the selected object appears or moves.

According to the exemplary embodiment illustrated in FIG. 3, metadata is previously generated and stored when a video image is input. Unlike in the exemplary embodiment illustrated in FIG. 3, in the present exemplary embodiment illustrated in FIG. 7, metadata is generated and stored when a summary still image is requested. In this case, instead of simply selecting a representative image frame on the basis of only an external shape of an object, by considering position relationship with other objects, an overlap between objects may be minimized so that more objects may be located in one summary still image. Accordingly, the number of summary still images may be reduced.

The image browsing system may perform the exemplary embodiment of FIG. 3 and the exemplary embodiment of FIG. 7 selectively according to the user's settings.

According to the exemplary embodiments, the summary image is not an abbreviated video image but an object-based image. Therefore, possibility of missing an object may be reduced and a plurality of objects may be recognized at a glance, so that the user's convenience may be provided. In particular, since the representative image of the object is selected on the basis of representative image selection scores, the existence/non-existence of an object may be quickly determined without spending unnecessary reproduction time. Also, the exemplary embodiments may provide low memory consumption and high processing speed. According to the exemplary embodiments, although all image frames may be acquired and provided as a database, since only a representative image of an object may be stored, a summary image may be immediately provided to the user upon receipt of a summary request. Also, the exemplary embodiments may provide the convenience of user search. Since images from appearance till disappearance of an object of interest are reproduced by placing a pointer such as a mouse on the object of interest, information about the object may be quickly acquired.

As described above, according to the above exemplary embodiments, by generating object-based summary still images, a plurality of objects may be identified at a glance and the user's convenience may be provided.

The summary image browsing methods according to the exemplary embodiments may also be embodied as computer-readable codes on a computer-readable recording medium. The computer-readable recording medium may be any data storage device that may store data which may be thereafter read by a computer system. Examples of the computer-readable recording medium may include ROMs, RAMs, CD-ROMs, magnetic tapes, floppy disks, and optical data storages. The computer-readable recording medium may also be distributed over network-coupled computer systems so that the computer-readable code may be stored and executed in a distributed fashion. Also, functional programs, codes, and code segments for accomplishing the inventive concept may be easily construed by programmers skilled in the art to which the inventive concept pertains.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method for browsing a summary still image, the method comprising:
    tracking a plurality of objects included in an input video image comprising a plurality of image frames, by an image processing engine;
    selecting a representative image frame of each of the plurality of objects from the plurality of image frames based on a plurality of object selection conditions, by the image processing engine;
    storing the selected representative image frames of the plurality of objects, by the image processing engine; and
    generating at least one summary still image by selecting two or more objects from the plurality of objects in a temporal order in which the two or more objects appear in the input video, until a number of the selected two or more objects reaches a maximum number of objects set for a single summary still image, by a browsing engine,
    wherein the maximum number of objects is set based on a number of the plurality of objects and a degree of overlapping between the plurality of objects,
    wherein the plurality of object selection conditions are given different score ranges according to a priority set to each of the plurality of object selection conditions,
    wherein the plurality of object selection conditions comprises a degree of overlapping between the plurality of objects, and
    wherein the selecting the representative image frame comprises selecting an image frame having a highest sum score for the plurality of object selection conditions as the representative image frame, from among the plurality of image frames.

2. The method of claim 1, wherein the plurality of object selection conditions further comprises a blur effect in the plurality of image frames.

3. The method of claim 1, further comprising providing a preview image of a motion of the two or more objects in response to a selection signal of selecting the two or more objects in the at least one summary still image.

4. The method of claim 3, further comprising reproducing the motion of the two or more objects in an order of time in response to a selection signal of selecting the preview image on the at least one summary still image.

5. The method of claim 1, further comprising:
receiving a search condition signal to instruct generation of the at least one summary still image; and
generating metadata of the representative image frame,
wherein the metadata comprises time information about the representative image frame and position information about the plurality of objects in the representative image frame.

6. The method of claim 5, wherein the selecting the representative image frame is performed after the receiving the search condition signal.

7. A system for browsing a summary still image, the system comprising:
an image processor configured to track a plurality of objects included in an input video image comprising a plurality of image frames, select a representative image frame of each of the plurality of objects from the plurality of image frames based on a plurality of object selection conditions and store the selected representative image frames of the plurality of objects; and
a browsing processor configured to generate at least one summary still image by selecting two or more objects from the plurality of objects in a temporal order in which the two or more objects appear in the input video, until a number of the selected two or more objects reaches a maximum number of objects set for a single summary still image,
wherein the maximum number of objects is set based on a number of the plurality of objects and a degree of overlapping between the plurality of objects,
wherein the plurality of object selection conditions are given different score ranges according to a priority set to each of the plurality of object selection conditions,
wherein the plurality of object selection conditions comprises a degree of overlapping between the plurality of objects, and
wherein the image processor is further configured to select an image frame having a highest sum score for the plurality of object selection conditions as the representative image frame, from among the plurality of image frames.

8. The system of claim 7, wherein the plurality of object selection conditions further comprises a blur effect in the plurality of image frames.

9. The system of claim 7, wherein the browsing engine is further configured to provide a preview image of a motion of the two or more objects in response to a selection signal of selecting the two or more objects in the at least one summary still image.

10. The system of claim 9, wherein the browsing processor is further configured to reproduce the motion of the two or more objects in an order of time in response to a selection signal of selecting the preview image on the at least one summary still image.

11. The system of claim 7, wherein the one or more processors further comprise a query processor configured to receive a search condition signal to instruct generation of the at least one summary still image,
wherein the image processor is further configured to generate metadata of the representative image frame, and
wherein the metadata comprises time information about the representative image frame and position information about the plurality of objects in the representative image frame.

12. The system of claim 11, wherein the image processor is further configured to select the representative image frame after the query processor receives the search condition signal.

* * * * *